(12) United States Patent
Chang et al.

(10) Patent No.: US 9,039,189 B2
(45) Date of Patent: May 26, 2015

(54) PROJECTION APPARATUS

(75) Inventors: Jui-Ping Chang, Hsinchu (TW); S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 437 days.

(21) Appl. No.: 13/179,578

(22) Filed: Jul. 11, 2011

(65) Prior Publication Data
US 2012/0092626 A1    Apr. 19, 2012

(30) Foreign Application Priority Data

Oct. 14, 2010   (TW) ............................... 99135066 A (51) Int. Cl.
| | |
|---|---|
| G03B 21/14 | (2006.01) |
| G03B 21/20 | (2006.01) |
| G02B 13/08 | (2006.01) |
| G03B 21/28 | (2006.01) |
| H04N 9/31 | (2006.01) |

(52) U.S. Cl.
CPC .............. *G03B 21/14* (2013.01); *G03B 21/208* (2013.01); *G03B 21/28* (2013.01); *H04N 9/3152* (2013.01)

(58) Field of Classification Search
CPC ..................................................... G03B 21/208
See application file for complete search history.

(56) References Cited

U.S. PATENT DOCUMENTS

| | | | | |
|---|---|---|---|---|
| 5,973,841 A | * | 10/1999 | Watanabe | ...................... 359/618 |
| 6,109,752 A | * | 8/2000 | Itoh et al. | ......................... 353/98 |
| 2005/0275809 A1 | * | 12/2005 | Ikebe et al. | ...................... 353/52 |
| 2008/0297910 A1 | | 12/2008 | Bhandari et al. | |
| 2009/0115082 A1 | | 5/2009 | Hosoe et al. | |
| 2009/0141503 A1 | * | 6/2009 | Phillips, III | .............. 362/311.06 |
| 2009/0168028 A1 | * | 7/2009 | Magarill | ......................... 353/81 |

FOREIGN PATENT DOCUMENTS

| | | |
|---|---|---|
| JP | 03-132617 | 6/1991 |
| JP | 2005-025177 | 1/2005 |
| TW | M245445 | 10/2004 |
| TW | 200424627 | 11/2004 |
| TW | 200801397 | 1/2008 |
| TW | 200923267 | 6/2009 |
| TW | D133603 | 3/2010 |

OTHER PUBLICATIONS

"Office Action of Taiwan Counterpart Application", issued on Jun. 3, 2013, with English translation thereof, p. 1-10.

* cited by examiner

*Primary Examiner* — William C Dowling
*Assistant Examiner* — Ryan Howard
(74) *Attorney, Agent, or Firm* — Jianq Chyun IP Office (57) ABSTRACT

A projection apparatus includes a light source, a light valve, a light uniforming device, and a lens module. The light source provides an illumination beam. The light valve on a transmission path of the illumination beam converts the illumination beam into an image beam. The light valve has an active surface with a rectangular shape. The light uniforming device is between the light source and the light value. The lens module is between the light uniforming device and the light value. A refractive power of the lens module along a first direction is different from a refractive power of the lens module along a second direction. An f-number of the illumination beam along a direction parallel to a long side of the active surface of the light valve is greater than an f-number thereof along a direction parallel to a short side of the active surface of the light valve.

12 Claims, 8 Drawing Sheets

PROJECTION APPARATUS

CROSS-REFERENCE TO RELATED APPLICATION

This application claims the priority benefit of Taiwan application serial no. 99135066, filed Oct. 14, 2010. The entirety of the above-mentioned patent application is hereby incorporated by reference herein and made a part of this specification.

BACKGROUND

1. Field of the Invention

The invention relates to a projection apparatus. Particularly, the invention relates to a projection apparatus capable of improving light utilization efficiency.

2. Description of Related Art

Generally, a conventional projection apparatus includes two lens arrays and a digital micro-mirror device (DMD), wherein the lens array includes a plurality of lens cells, and the lens cells in the two lens arrays are corresponded one-by-one. A light beam is guided to the DMD by the lens units on the lens arrays, so as to achieve functions of beam shaping and light spot uniformization. However, since a shape of the DMD is a rectangle, a shape of the lens cell of the conventional technique is also required to be a rectangle, so as to produce a uniform light spot with a preferred shape on the DMD.

In the conventional projection apparatus, the lens array located closer to a light source has a specific effective light receiving angle range. After the light beam emitted from the light source enters a lens cell of the lens array located closer to the light source in an angle within the effective light receiving angle range, it is further transmitted the corresponding lens cell of the other lens array and then transmitted to the DMD. However, after the light beam enters a lens cell of the lens array located closer to the light source in an angle outside the effective light receiving angle range, it cannot be transmitted to the corresponding lens cell of the other lens array, but is transmitted to another lens cell next to the corresponding lens cell, so that a propagating direction of the light beam is deviated and the light beam cannot reach the DMD, which may cause a light loss, which is a so-called crosstalk phenomenon, and brightness interference causes the light loss.

Since the effective light receiving angle range of each of the lens cell is related to a width of the lens cell, when the light beam passes through the lens cell, an effective light receiving angle of the light at a short side of the lens cell is smaller than an effective light receiving angle of the light at a long side of the lens cell. Therefore, when an incident angle of the light beam incident to the lens cell is greater than the effective light receiving angle of the lens cell, the propagating direction of the light beam is deviated from the DMD, which may cause loss of light utilization efficiency. Since a currently popular display image is developed towards a trend of 16:9 widescreen, a length-width ratio of the lens unit of the DMD used by the conventional projection apparatus is also 16:9. Therefore, the short side of the lens cell is liable to be excessively short, so that the effective light receiving angle along a direction parallel to the short side is excessively small, which may cause more loss of light.

Taiwan Patent No. I300834 discloses a lighting system including a point light source array, a lens and a collimating lens, wherein the collimating lens is disposed between the point light source array and the lens. Moreover, Taiwan Patent No. I324237 discloses a lens cell having a body, a light incident surface, a light emitting surface, a divergent part, and a convergent part.

SUMMARY OF THE INVENTION

The invention is directed to a projection apparatus, in which a lens module is used to shape an illumination beam, so as to improve light utilization efficiency.

Additional aspects and advantages of the invention will be set forth in the description of the techniques disclosed in the invention.

To achieve one of or a part of or all of aforementioned or other advantages, an embodiment of the invention provides a projection apparatus including a light source, a light uniforming device, a light valve, and a lens module. The light source is capable of providing an illumination beam. The light valve is disposed on a transmission path of the illumination beam for converting the illumination beam into an image beam. The light valve has an active surface, and the active surface is substantially rectangular-shaped. The light uniforming device is disposed on the transmission path of the illumination beam and is located between the light source and the light valve. The lens module is disposed on the transmission path of the illumination beam and is located between the light uniforming device and the light valve. A refractive power of the lens module along a first direction is not equal to a refractive power of the lens module along a second direction, so that an f-number of the illumination beam along a direction parallel to a long side of the active surface of the light valve is greater than an f-number of the illumination beam along a direction parallel to a short side of the active surface of the light valve.

According to the above descriptions, the invention may achieve at least one of the following advantages or effects. In the projection apparatus of the invention, since the lens module can shape a light spot formed by the illumination beam into a rectangular shape to cope with a shape of the active surface of the light valve, an amount of the illumination beam irradiated on the light valve can be increased, so as to improve the light utilization efficiency of the projection apparatus.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1A:
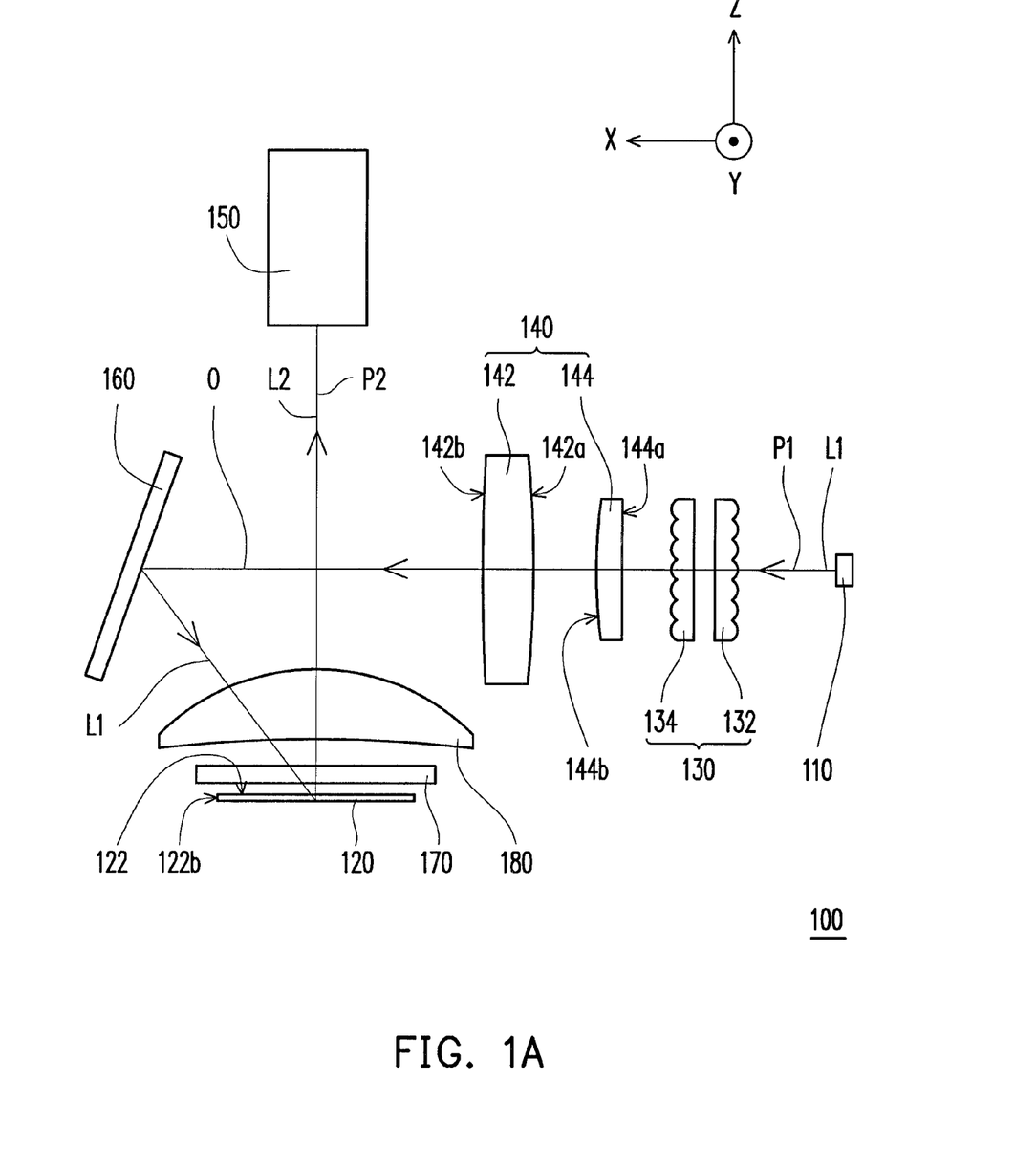
FIG. 1A is a top view of a projection apparatus according to a first embodiment of the invention.

FIG. 1A is a top view of a projection apparatus 100 according to a first embodiment of the invention. Referring to FIG. 1A, the projection apparatus 100 of the embodiment includes a light source 110, a light valve 120, a light uniforming device 130 and a lens module 140. The light source 110 is capable of providing an illumination beam L1, and the light source 110 is, for example, a light emitting diode (LED). The light valve 120 is disposed on a transmission path P1 of the illumination beam L1 for converting the illumination beam L1 into an image beam L2. The light valve 120 has an active surface 122, and as that shown in FIG. 1B, the active surface 122 is substantially rectangular-shaped. Moreover, the light uniforming device 130 is disposed on the transmission path P1 of the illumination beam L1, and is located between the light source 110 and the light valve 120. The lens module 140 is disposed on the transmission path P1 of the illumination beam L1, and is located between the light uniforming device 130 and the light valve 120. The light valve 120 is, for example, a digital micro-mirror device (DMD), a liquid-crystal-on-silicon panel (LCOS panel) or a transmissive liquid crystal panel.

Figure 1B:
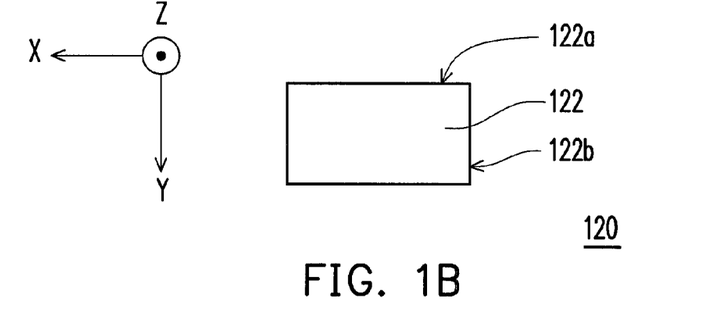
FIG. 1B is a top view of a light valve of FIG. 1A on an XY plane.
Figure 1C:
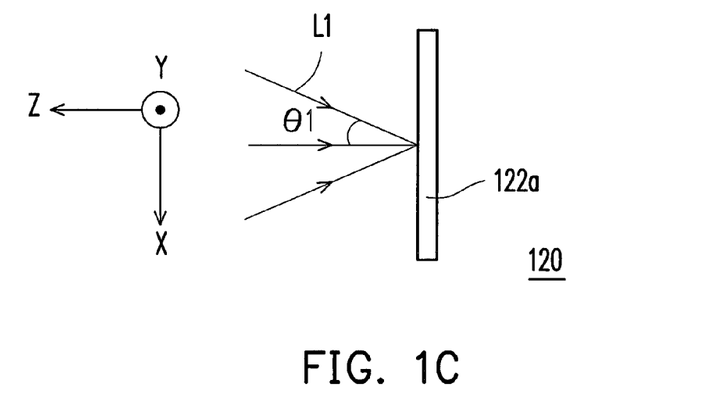
FIG. 1C and FIG. 1D are top views of a light valve of FIG. 1B along a direction Y and a direction X.
Figure 1D:
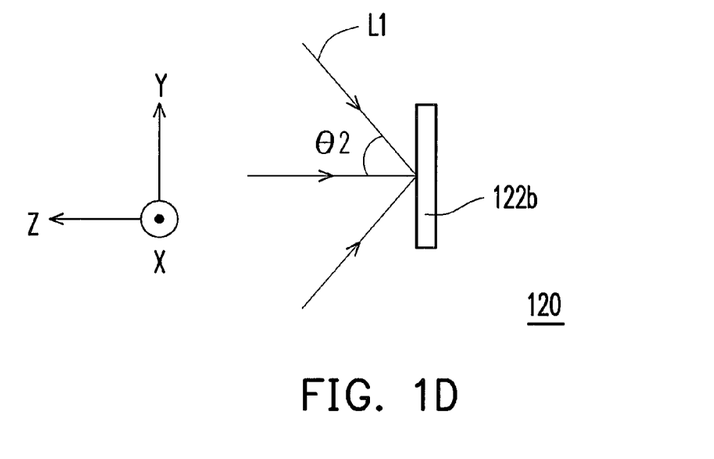

FIG. 1C and FIG. 1D are top views of the light valve 120 of FIG. 1B along a direction Y and a direction X, i.e. top views viewing from a long side 122a and a short side 122b of the light valve 120. Referring to FIG. 1A, FIG. 1C and FIG. 1D, since a refractive power of the lens module 140 along a direction Z is not equal to a refractive power of the lens module 140 along the direction Y, an f-number of the illumination beam L1 along a direction parallel to the long side 122a (for example, the direction X) of the active surface 122 of the light valve 120 is greater than an f-number of the illumination beam L1 along a direction parallel to the short side 122b (for example, the direction Y) of the active surface 122 of the light valve 120, wherein the f-number=$1/(2 \sin \theta)$, and $\theta$ is a half angle of a light cone formed when a light beam is incident to the light valve 120 (for example, angles $\theta 1$ and $\theta 2$). According to the above equation and FIG. 1C and FIG. 1D, it is known that the angle $\theta 1$ is less than the angle $\theta 2$, so that the f-number of the illumination beam L1 along a direction parallel to the long side 122a of the active surface 122 of the light valve 120 is greater than the f-number of the illumination beam L1 along a direction parallel to the short side 122b of the active surface 122 of the light valve 120. Besides, in the embodiment, the direction Z is substantially perpendicular to the direction Y. Moreover, the direction Z is substantially perpendicular to an optical axis O of the lens module 140, and the direction Y is substantially perpendicular to the optical axis O of the lens module 140. Moreover, the optical axis O is parallel to the direction X.

Figure 1E:
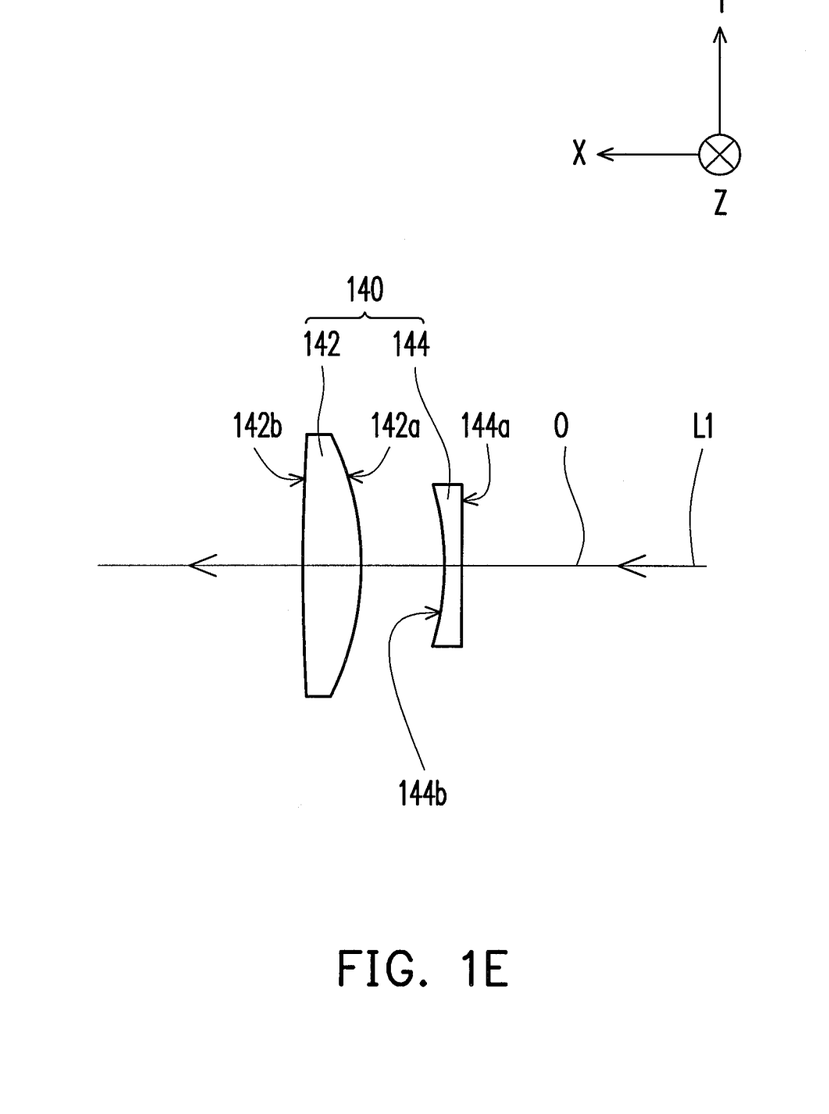
FIG. 1E is a top view of a lens module of FIG. 1A on an XY plane.

FIG. 1E is a top view of the lens module 140 of FIG. 1A on an XY plane. Referring to FIG. 1A and FIG. 1E, the lens module 140 of the embodiment includes a lens 142, and a curvature of at least one surface 142a of the lens 142 along the direction Y (shown in FIG. 1E) is not equal to a curvature of the at least one surface 142a of the lens 142 along the direction Z (shown in FIG. 1A), and the illumination beam L1 passes through the surface 142a. In other words, a radius of curvature of the surface 142a along the direction Y is different to that along the direction Z, or positive and negative signs of the radius of curvature thereof are different, i.e. bending directions of the surface 142a are different, and a shape of the lens surface can be convex or concave. For example, in the embodiment, the radius of curvature of the surface 142a in FIG. 1E along the direction Y is less than the radius of curvature of the surface 142a in FIG. 1A along the direction Z, and the radius of curvatures are all positive, so that the surface 142a is a convex surface. However, in other embodiments, the curvatures of the surface 142a along the directions Y and Z can be respectively a positive curvature and a negative curvature. Moreover, the lens 142 of the embodiment is, for example, a biconic lens. Besides, in the embodiment, a curvature of another surface 142b of the lens 142 along the direction Y is also different to a curvature thereof along the direction Z, and the illumination beam L1 passes through the surface 142a and the surface 142b.

On the other hand, as shown in FIG. 1A and FIG. 1E, the lens module 140 of the embodiment further includes a lens 144, and a curvature of at least a surface 144b of the lens 144 along the direction Y is not equal to a curvature thereof along the direction Z. In detail, the curvature of the surface 144b in FIG. 1A along the direction Y is, for example, positive, the curvature of the surface 144b in FIG. 1E along the direction Z is, for example, negative, and a radius of curvature of the surface 144b along the direction Y is greater than a radius of curvature of the surface 144b along the direction Z. Similarly, a curvature of another surface 144a of the lens 144 along the direction Y is also different to a curvature thereof along the direction Z. Therefore, the refractive power of the lens module 140 along the direction Y is not equal to the refractive power of the lens module 140 along the direction Z. Therefore, as shown in FIG. 1C and FIG. 1D, based on the above optical design, the angle θ1 of the illumination beam L1 along a direction parallel to the long side 122a of the active surface 122 of the light valve 120 is less than the angle θ2 of the illumination beam L1 along a direction parallel to the short side 122b of the active surface 122 of the light valve 120. Namely, the f-number of the illumination beam L1 along a direction parallel to the long side 122a of the active surface 122 of the light valve 120 is greater than the f-number thereof along a direction parallel to the short side 122b of the active surface 122 of the light valve 120, wherein the f-number long the direction of the long side 122a is, for example, 2.94, and the f-number along the direction of the short side 122b is, for example, 2.01.

It should be noticed that the optical design of the lens module 140 is not limited to the above descriptions, and any design ensuring that the f-number of the illumination beam L1 along a direction parallel to the long side 122a of the active surface 122 of the light valve 120 is greater than the f-number thereof along a direction parallel to the short side 122b of the active surface 122 of the light valve 120 is considered to be within the scope of the invention.

Referring to FIG. 1A, in the embodiment, the projection apparatus 100 further includes a projection lens 150. The projection lens 150 is disposed in a transmission path P2 of the image beam L2. Moreover, the projection apparatus 100 further includes a reflection unit 160. The reflection unit 160 is disposed on the transmission path P1 of the illumination beam L1, and is located between the light uniforming device 130 and the light valve 120 for reflecting the illumination beam L1 to the light valve 120. Besides, the projection lens 150 further includes a field lens 180. The field lens 180 is disposed on the transmission path P1 of the illumination beam L1, and is located between the light uniforming device 130 and the light valve 120. The field lens 180 is further disposed on the transmission path P2 of the image beam L2, and is located between the light valve 120 and the projection lens 150. Moreover, a glass cover 170 can be disposed in front of the light valve 120 for protecting the light valve 120.

Figure 1F:
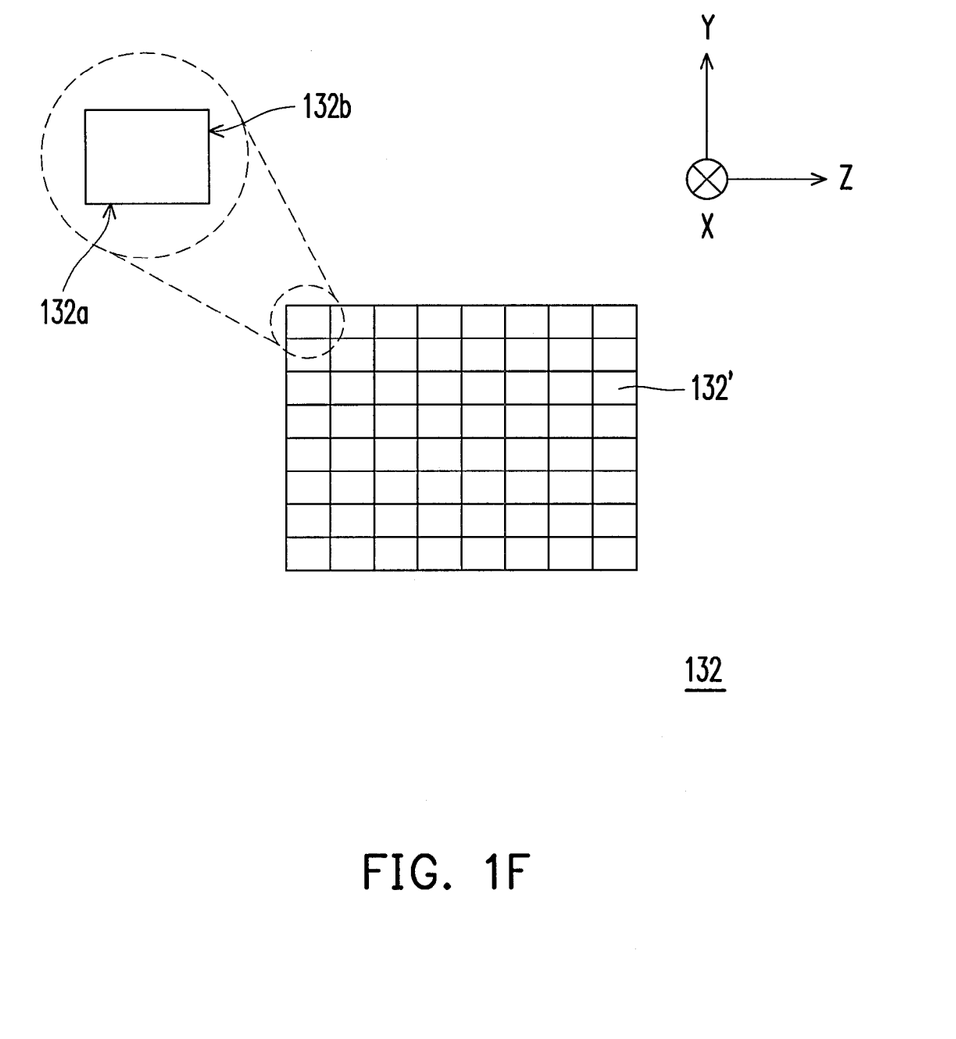
FIG. 1F is a top view of a lens array of FIG. 1A on a YZ plane.

Besides, the light uniforming device 130 of the embodiment at least includes a lens array 132 and a lens array 134 (two lens arrays are schematically illustrated in FIG. 1A). In another embodiment, the lens array 132 and the lens array 134 are, for example, formed integrally. Moreover, in other embodiments, the light uniforming device 130 does not include the lens array 134, i.e. the light uniforming device 130 only includes one lens array 132. FIG. 1F is a top view of the lens array 132 of FIG. 1A on a YZ plane. Referring to FIG. 1B and FIG. 1F, in the embodiment, the lens array 132 has a plurality of rectangular lenses 132' arranged in an array. A ratio between a length of a short side 132b of each of the rectangular lenses 132' and a length of a long side 132a of each of the rectangular lenses 132' is greater than a ratio between a length of the short side 122b of the active surface 122 of the light valve in FIG. 1B and a length of the long side 122a of the active surface 122 of the light valve 120. Further, the ratio between the length of the short side 132b of each of the rectangular lens 132' and the length of the long side 132a of each of the rectangular lenses 132' is substantially equal to 1, i.e. in the embodiment, a shape of the rectangular lens 132' is substantially a square.

Since a length ratio of the short side 132b and the long side 132a of the rectangular lens 132' can be different to a length ratio of the short side 122b and the long side 122a of the active surface 122 of the light valve 120, the short side 132b of the rectangular lens 132' can be designed to have a relatively long length, so as to increase an effective light receiving angle range along a direction parallel to the short side 132b to reduce light loss. Moreover, since the lens module 140 can shape the light spot formed by the illumination beam L1 into a rectangular shape to cope with the rectangular shape of the active surface 122 of the light valve 120, an amount of the illumination beam L1 irradiated on the light valve 120 can be increased, so as to improve the light utilization efficiency of the projection apparatus 100.

In other words, according to the above description of the lens module 140, it is known that the lens module 140 makes the f-number of the illumination beam L1 along a direction parallel to the short side 122b of the active surface 122 of the light valve 120 to be less than the f-number thereof along a direction parallel to the long side 122a of the active surface 122 of the light valve 120, so that the lens module 140 can shape an object with the length-width ratio of 1 into an image with the length-width ratio greater than 1. Therefore, since side length of the rectangular lenses 132' with the length-width ratio of 1 is relatively long, the lens module 140 of the embodiment can reduce a change that the illumination beam L1 deviates from the rectangular light valve 120 (i.e. mitigate a crosstalk loss), so as to improve the light utilization efficiency. For example, by using the lens module 140, the crosstalk loss can be reduced from 15.5% to 7.2%, and the light utilization efficiency can be increased from 55.6% to 63.8%. The aforementioned object is, for example, an image formed by the illumination beam L1 after passing through the light uniforming device 130, and the image is, for example, a light spot on the rectangular light valve 120.

Second Embodiment

Figure 2:
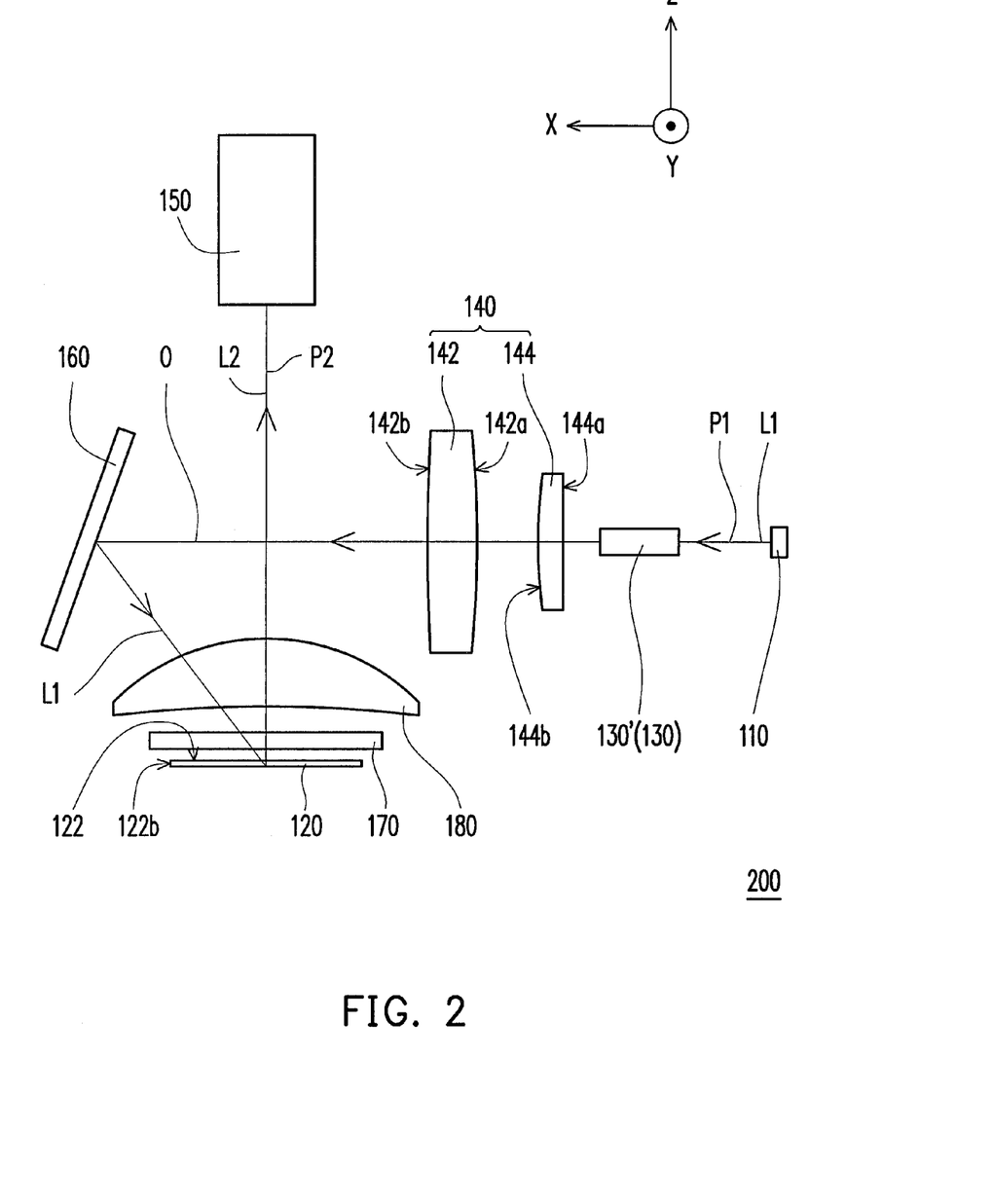
FIG. 2 is a top view of a projection apparatus according to a second embodiment of the invention.

FIG. 2 is a top view of a projection apparatus 200 according to another embodiment of the invention. The projection apparatus 200 of the embodiment is similar to the projection apparatus 100, and a main difference therebetween is that the light uniforming device 130 of the projection apparatus 200 is a light integration rod 130'.

Third Embodiment

Figure 3:
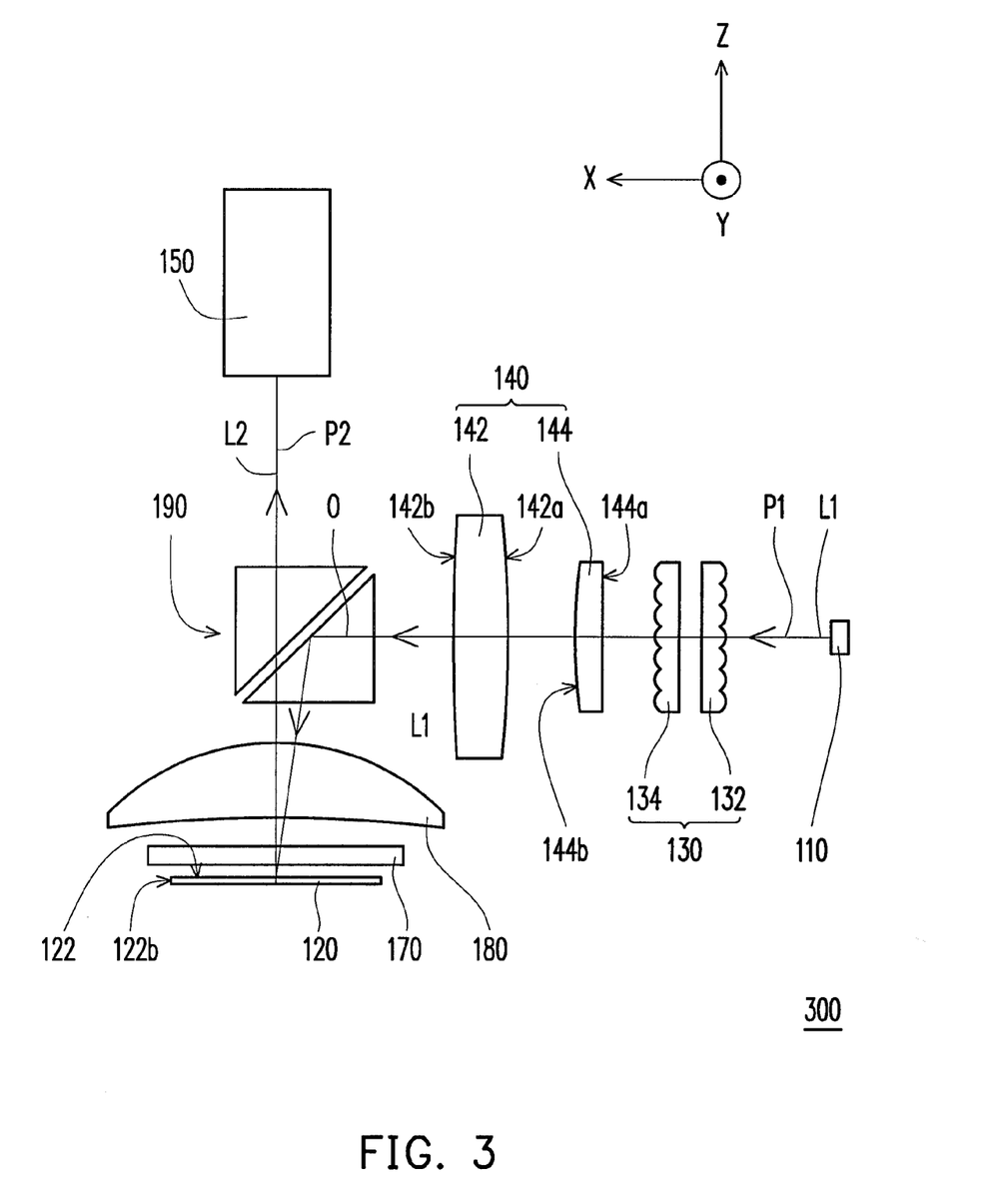
FIG. 3 is a top view of a projection apparatus according to a third embodiment of the invention.

FIG. 3 is a top view of a projection apparatus 300 according to another embodiment of the invention. The projection apparatus 300 of the embodiment is similar to the projection apparatus 100, and a main difference there between is that the projection apparatus 300 further includes a total internal reflection prism (TIR prism) 190 without including the reflection unit 160 of FIG. 1. As shown in FIG. 3, the TIR prism 190 is disposed on the transmission path P1 of the illumination beam L1, and is located between the light source 110 and the light valve 120. Moreover, the TIR prism 190 is also disposed on the transmission path P2 of the image beam L2, and is located between the light valve 120 and the projection lens 150.

In the embodiment, the TIR prism 190 is adapted to reflect the illumination beam L1 to the light valve 120, and is passed by the image beam L2, so as to transmit the image beam L2 to the projection lens 150.

Fourth Embodiment

Figure 4A:
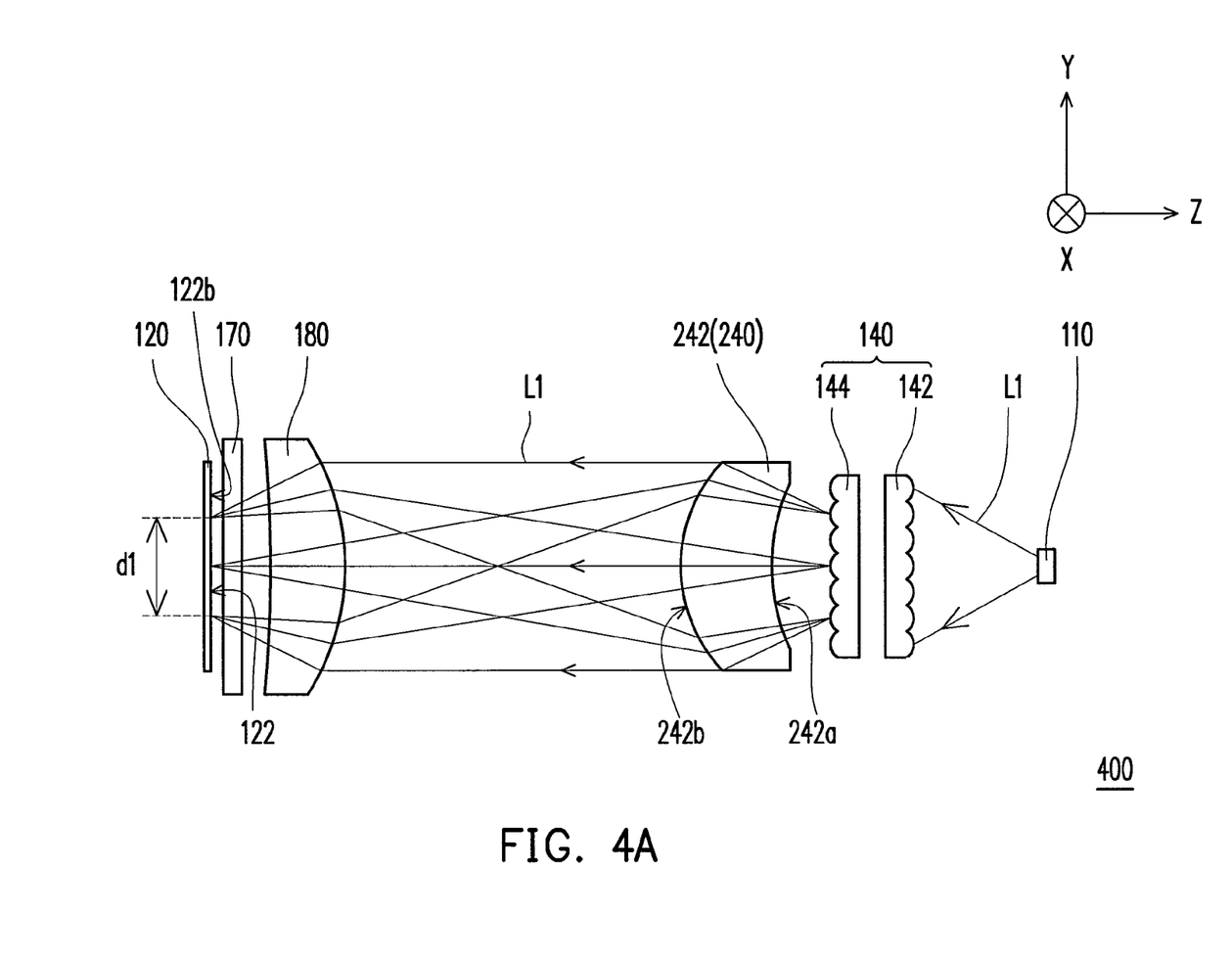
FIG. 4A and FIG. 4B are respectively top views of a projection apparatus along a direction X and a direction Y according to a fourth embodiment of the invention.
Figure 4B:
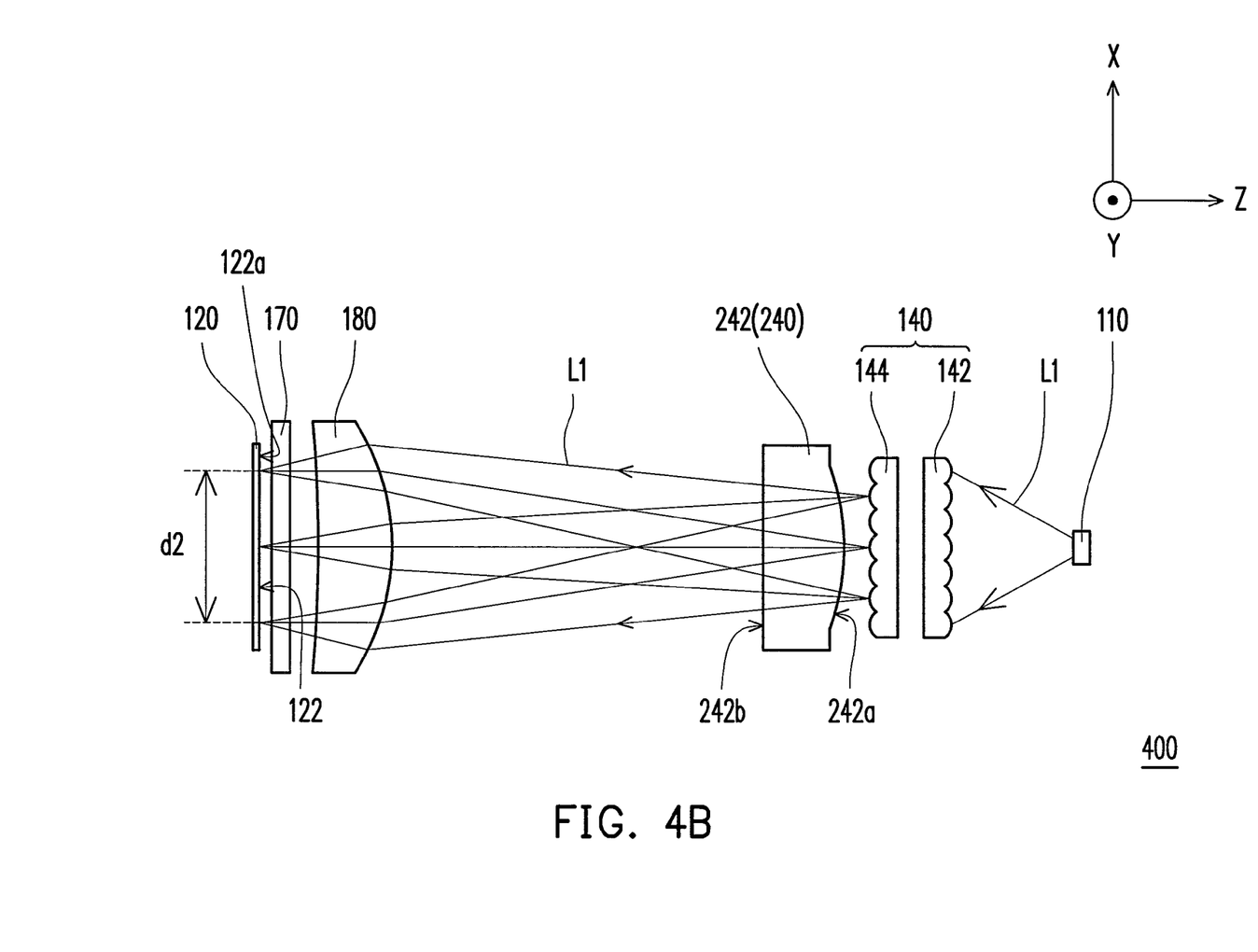

FIG. 4A and FIG. 4B are respectively top views of a projection apparatus 400 along a direction Y and a direction X according to a fourth embodiment of the invention. For simplicity's sake, the transmission path of the illumination beam L1 between the light source 110 and a lens module 240 is turned to be consistent with the transmission path P1 of the illumination beam L1 between the lens module 240 and the light valve 120. The projection apparatus 400 of the embodiment is similar to the projection apparatus 300, and a main difference therebetween is that the lens module 240 applies a lens 242 to replace the lens 122 and the lens 144 of FIG. 1A.

Referring to FIG. 4A and FIG. 4B, the lens 242 includes a surface 242a and a surface 242b. A curvature of the surface 242a along the direction X in FIG. 4B is not equal to a curvature of the surface 242a along the direction Y in FIG. 4A, and a curvature of the surface 242b along the direction X in FIG. 4B is also different to a curvature of the surface 242b along the direction Y in FIG. 4A. In detail, the curvature of the surface 242a along the direction Y in FIG. 4A is, for example, negative, and the curvature of the surface 242a along the direction X in FIG. 4B is, for example, positive. The curvature of the surface 242a along the direction Y is, for example, greater than the curvature of the surface 242a along the direction X. In this way, as that shown in FIG. 4A and FIG. 4B, an imaging length d1 of the illumination beam L1 along a direction parallel to the short side 122b of the active surface 122 of the light valve 120 is smaller than an imaging length d2 of the illumination beam L1 along a direction parallel to the long side 122a of the active surface 122 of the light valve 120, wherein the imaging length d1 and the imaging length d2 are, for example, 2.8 mm and 3.45 mm. Therefore, the lens module 240 of the embodiment is capable of converting an object with a length-width ratio of 1:1 into an image with a length-width ratio of 16:13. The object is, for example, an image formed by the illumination beam L1 after passing through the light uniforming device 130, and the image is, for example, a light spot on the light valve 120. Namely, the lens module 240 makes the f-number of the illumination beam L1 along a direction parallel to the short side 122b of the active surface 122 of the light valve 120 to be less than the f-number of the illumination beam L1 along a direction parallel to the long side 122a of the active surface 122 of the light valve 120.

In summary, the embodiments of the invention may achieve at least one of the following advantages or effects. The lens module can be used to shape the illumination beam passing through the uniforming device into a rectangular shape, so as to increase an amount of the illumination beam irradiated on the light valve, and accordingly improve the light utilization efficiency of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
a light source, capable of providing an illumination beam;
a light valve, disposed on a transmission path of the illumination beam for converting the illumination beam into an image beam, wherein the light valve has an active surface, and the active surface is substantially rectangular-shaped;
a light uniforming device, disposed on the transmission path of the illumination beam, and located between the light source and the light valve, wherein the light uniforming device comprises at least one lens array, and the lens array has a plurality of rectangular lenses arranged in an array, and a ratio between a length of a first side of each of the rectangular lenses and a length of a second side of each of the rectangular lenses is greater than a ratio between a length of a short side of the active surface of the light valve and a length of a long side of the active surface of the light valve, and the first side of each of the rectangular lenses is corresponding to the short side of the active surface of the light valve, and the second side of each of the rectangular lenses is corresponding to the long side of the active surface of the light valve; and
a lens module, disposed on the transmission path of the illumination beam, and located between the light uniforming device and the light valve, wherein a refractive power of the lens module along a first direction is not equal to a refractive power of the lens module along a second direction, and thereby an f-number of the illumination beam along a direction parallel to a long side of the active surface of the light valve is greater than an f-number of the illumination beam along a direction parallel to a short side of the active surface of the light valve,
wherein the ratio between the length of the first side of each of the rectangular lenses and the length of the second side of each of the rectangular lenses is substantially 1, and the first side and the second side are adjacent to each other.

2. The projection apparatus as claimed in claim 1, wherein the first direction is substantially perpendicular to the second direction.

3. The projection apparatus as claimed in claim 2, wherein the first direction is substantially perpendicular to an optical axis of the lens module, and the second direction is substantially perpendicular to the optical axis of the lens module.

4. The projection apparatus as claimed in claim 1, wherein the lens module comprises a lens, and a curvature of at least one surface of the lens along the first direction is not equal to a curvature of the at least one surface of the lens along the second direction, and the illumination beam passes through the surface of the lens.

5. The projection apparatus as claimed in claim 4, wherein the first direction is substantially perpendicular to the second direction.

6. The projection apparatus as claimed in claim 1, further comprising a projection lens disposed on a transmission path of the image beam.

7. The projection apparatus as claimed in claim 6, further comprising a total internal reflection prism, disposed on the transmission path of the illumination beam and located between the light source and the light valve, wherein the total internal reflection prism is also disposed on the transmission path of the image beam, and is located between the light valve and the projection lens.

8. The projection apparatus as claimed in claim 6, further comprising a field lens disposed on the transmission path of the illumination beam and located between the light uniforming device and the light valve, wherein the field lens is further disposed on the transmission path of the image beam, and is located between the light valve and the projection lens.

9. The projection apparatus as claimed in claim 1, further comprising a reflection unit disposed on the transmission path of the illumination beam and located between the light uniforming device and the light valve, for reflecting the illumination beam to the light valve.

10. The projection apparatus as claimed in claim 1, wherein the light source is a light emitting diode.

11. A projection apparatus, comprising:
a light source, capable of providing an illumination beam;
a light valve, disposed on a transmission path of the illumination beam for converting the illumination beam into an image beam, wherein the light valve has an active surface, and the active surface is substantially rectangular-shaped;
a lens array device, disposed on the transmission path of the illumination beam, and located between the light source and the light valve, wherein the lens array device comprises a plurality of rectangular lenses arranged in an array; and
a lens module, disposed on the transmission path of the illumination beam, and located between the lens array device and the light valve, wherein a refractive power of the lens module along a first direction is not equal to a refractive power of the lens module along a second direction, and thereby an f-number of the illumination beam along a direction parallel to a long side of the active surface of the light valve is greater than an f-number of the illumination beam along a direction parallel to a short side of the active surface of the light valve,
wherein the lens module comprises a first lens and a second lens disposed on the transmission path of the illumination beam and spaced apart by a distance,
wherein a curvature of a surface of the first lens along the first direction is not equal to a curvature of the surface of the first lens along the second direction, a curvature of another surface of the first lens along the first direction is not equal to a curvature of the another surface of the first lens along the second direction,
wherein a curvature of a surface of the second lens along the first direction is not equal to a curvature of the surface of the second lens along the second direction, a curvature of another surface of the second lens along the first direction is not equal to a curvature of the another surface of the second lens along the second direction.

12. The projection apparatus as claimed in claim 11, wherein a ratio between a length of a short side of each of the rectangular lenses and a length of a long side of each of the rectangular lenses is greater than a ratio between a length of the short side of the active surface of the light valve and a length of the long side of the active surface of the light valve, and the short side of each of the rectangular lenses is corresponding to the short side of the active surface of the light valve, and the long side of each of the rectangular lenses is corresponding to the long side of the active surface of the light valve.

* * * * *